United States Patent
Sherry

(10) Patent No.: US 10,513,444 B1
(45) Date of Patent: Dec. 24, 2019

(54) WATER DISPOSAL SYSTEM USING AN ENGINE AS A WATER HEATER

(71) Applicant: Raymond C. Sherry, Cleburne, TX (US)

(72) Inventor: Raymond C. Sherry, Cleburne, TX (US)

( * ) Notice: Subject to any disclaimer, the term of this patent is extended or adjusted under 35 U.S.C. 154(b) by 0 days.

(21) Appl. No.: 15/801,469

(22) Filed: Nov. 2, 2017

Related U.S. Application Data

(60) Provisional application No. 62/496,946, filed on Nov. 2, 2016.

(51) Int. Cl.
| | |
|---|---|
| *C02F 1/06* | (2006.01) |
| *B05B 1/30* | (2006.01) |
| *E21B 41/00* | (2006.01) |
| *C02F 1/04* | (2006.01) |
| *B01D 1/16* | (2006.01) |
| *C02F 103/10* | (2006.01) |
| *C02F 101/32* | (2006.01) |

(52) U.S. Cl.
CPC ............... *C02F 1/06* (2013.01); *B01D 1/16* (2013.01); *B05B 1/3006* (2013.01); *C02F 1/048* (2013.01); *E21B 41/005* (2013.01); *C02F 2101/32* (2013.01); *C02F 2103/10* (2013.01); *C02F 2201/009* (2013.01); *C02F 2301/04* (2013.01); *C02F 2303/10* (2013.01)

(58) Field of Classification Search
CPC ........ C02F 2103/10; C02F 1/048; C02F 1/06; E21B 41/005
See application file for complete search history.

(56) References Cited

U.S. PATENT DOCUMENTS

| | | | |
|---|---|---|---|
| 2,046,666 A * | 7/1936 | Whitsitt | B61D 27/0072 105/25.1 |
| 3,954,381 A | 5/1976 | Marecaux | |
| 4,303,121 A | 12/1981 | Pangborn | |
| 5,110,418 A * | 5/1992 | Garrison | B01D 3/02 137/392 |
| 5,342,482 A | 8/1994 | Duesel, Jr. | |
| 5,968,312 A * | 10/1999 | Sephton | B01D 1/065 159/18 |
| 6,200,428 B1 | 3/2001 | VanKouwenberg | |
| 6,279,493 B1 | 8/2001 | Beaumont | |
| 6,309,542 B1 | 10/2001 | Kim | |
| 6,546,883 B1 | 4/2003 | Fink et al. | |
| 7,150,111 B2 | 12/2006 | Viljanmaa | |
| 7,803,248 B2 | 9/2010 | Pinkham, Jr. et al. | |

(Continued)

OTHER PUBLICATIONS

U.S. Appl. No. 15/041,164, filed Feb. 11, 2016, Raymond C. Sherry.

*Primary Examiner* — Matthew R Buck
*Assistant Examiner* — Aaron L Lembo
(74) *Attorney, Agent, or Firm* — Roger N. Chauza, PC

(57) ABSTRACT

A water hydration system for disposing of the water content of the production water recovered from a hydrocarbon well. An internal combustion engine is utilized to drive electrical generators, pumps, etc., to provide electrical and mechanical power to the equipment of the well site. The engine includes a cooling system through which preprocessed production water flows to elevate the temperature thereof. The heated water is then sprayed into hot air to hydrate the air before being released to the atmosphere.

20 Claims, 4 Drawing Sheets

(56) References Cited

U.S. PATENT DOCUMENTS

| | | | |
|---|---|---|---|
| 9,295,966 B1* | 3/2016 | Appelbaum | C02F 1/34 |
| 9,447,313 B2 | 9/2016 | Weinstein et al. | |
| 9,764,497 B2 | 9/2017 | Saffioti | |
| 2004/0008571 A1 | 1/2004 | Coody et al. | |
| 2007/0235146 A1* | 10/2007 | Haslem | B01D 1/16 |
| | | | 159/47.3 |
| 2007/0235164 A1* | 10/2007 | Miyagawa | F01N 5/02 |
| | | | 165/104.14 |
| 2009/0235586 A1* | 9/2009 | Katoh | C10L 3/108 |
| | | | 48/127.9 |
| 2012/0031303 A1* | 2/2012 | Constantz | C04B 14/26 |
| | | | 106/640 |
| 2012/0228114 A1 | 9/2012 | Joseph, III et al. | |
| 2013/0037223 A1 | 2/2013 | Duesel, Jr. | |
| 2014/0208796 A1* | 7/2014 | Harms | F25B 39/02 |
| | | | 62/516 |
| 2014/0262737 A1* | 9/2014 | Shields | F03B 13/142 |
| | | | 203/11 |
| 2016/0115775 A1* | 4/2016 | Eaton | B01D 51/10 |
| | | | 95/39 |
| 2016/0258266 A1* | 9/2016 | Frick | B01D 3/007 |
| 2016/0348439 A1* | 12/2016 | Wang | E21B 7/18 |
| 2017/0114271 A1* | 4/2017 | Hudgens | C09K 8/685 |
| 2018/0094825 A1* | 4/2018 | Peczalski | F24F 13/22 |

* cited by examiner

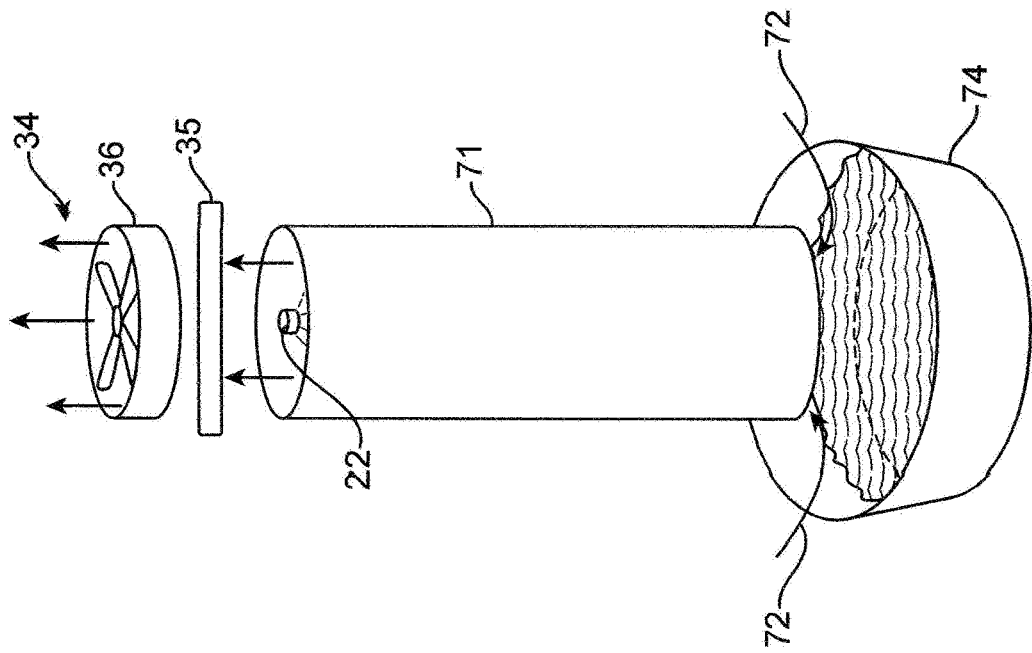
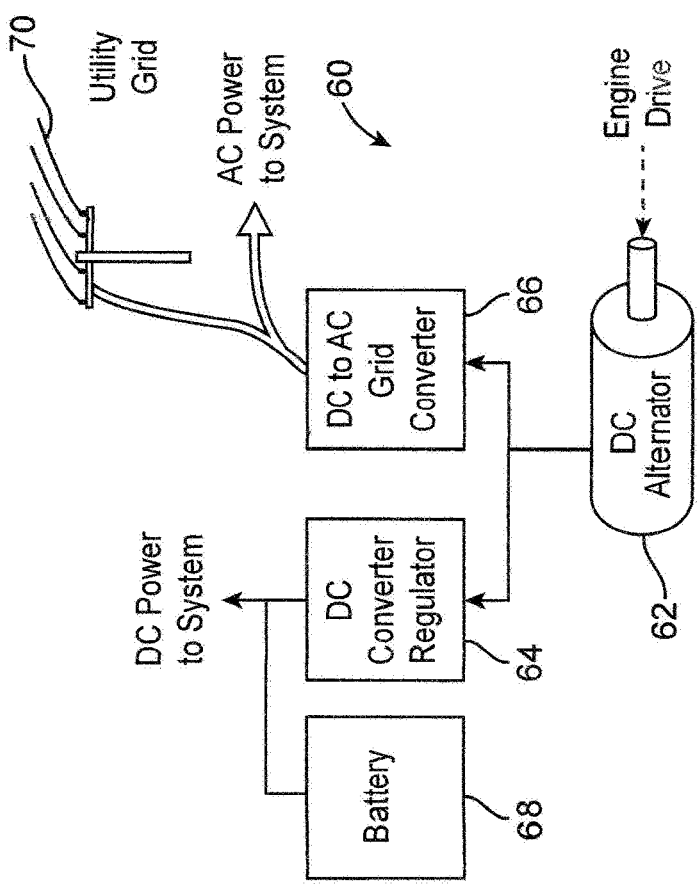
FIG. 4
FIG. 3

WATER DISPOSAL SYSTEM USING AN ENGINE AS A WATER HEATER

RELATED APPLICATION

This U.S. non-provisional patent application claims the benefit of U.S. provisional application Ser. No. 62/496,946, filed Nov. 2, 2016.

TECHNICAL FIELD OF THE INVENTION

The present invention relates in general to water processing systems, and more particularly to methods and apparatus for more efficiently processing production water produced from gas wells by using the thermal energy generated by an engine as a source of heat to heat the production water during processing thereof to dispose of the same.

BACKGROUND OF THE INVENTION

Gas wells are developed by drilling a borehole in a formation where the natural gas is believed to exist. The borehole is then fractured by forcing a high pressure liquid, such as water, into the borehole to create fractures throughout the formation and allow the pressurized gas to migrate to the borehole and thus be retrieved at the surface. It often requires a million gallons of water, or more, to carry out the fracturing process. After the formation is fractured, the pressure of the natural gas in the formation is sufficient to cause the gas to migrate from the higher pressure pockets to the lower pressure borehole, and thus to the surface.

Once the gas well begins to produce the hydrocarbon products, the water initially forced down the borehole to fracture the formation, along with water within the formation and the liquid hydrocarbons, are forced to the surface together with the natural gas. The production water that returns to the surface is contaminated with other toxic substances and a significant mineral content, all that must be considered. Traditionally, the production water has been disposed of by hauling it with a tanker truck to a disposal well, or disposed of by even less desirable methods. A disposal well is a special well that is drilled to a deep depth so that the toxic production water pumped therein will theoretically not contaminate aquifers and other sources of ground water.

A technology has been developed by Raymond C. Sherry where the production water from both gas wells and oil wells can be processed at the well site and be disposed of appropriately. See the Sherry U.S. Pat. Nos. 7,963,459; 8,097,128; 8,372,248; 8,602,320 and 8,915,453, which are incorporated herein by reference thereto. These patents generally involve the flash evaporation of the water content of the production water to produce a purified form of water that can be readily reused or otherwise disposed of. The toxic substances and other particulate matter are separated from the water content and disposed of separately. In order to flash evaporate the water content of the production water, a heater is employed to generate the high temperatures necessary to heat the water under a high pressure so that when forced through a specialized variable-size orifice nozzle, the hot water flashes into steam in an evaporation chamber. The steam is subsequently condensed to form the purified form of water.

As is described in the Sherry patents, the gas generated by the gas well is used as the fuel in the burner to heat the production water. The gas can also be employed as a fuel for an engine to drive an AC generator to produce electrical energy required by the water purification system. Any additional AC power that is not used by the purification system can be coupled to the AC power grid to reduce the operational cost of operating the water purification system in the field.

There exists a constant need to make more efficient the water disposal systems, especially when operating in the field and the only source of energy is the hydrocarbon materials that are produced from the oil or gas formations. Accordingly, there is a need to utilize the excess thermal energy that is generated by the system and use it elsewhere to heat various components of the system.

SUMMARY OF THE INVENTION

In accordance with the principles and concepts of the invention, disclosed is a water hydration system for disposing the water content of the production water recovered from a hydrocarbon well. An internal combustion engine includes a cooling system through which preprocessed production water flows to elevate the temperature thereof. The heated water is then sprayed into hot air to hydrate the air before being released to the atmosphere.

According to a feature of the invention, the engine is also utilized to drive electrical generators, pumps, etc., to provide electrical and mechanical power to the equipment of the well site. The engine thus provides thermal energy to the hydration sustem, as well as power to drive the well site equipment.

According to another feature of the invention, the internal combustion engine is fueled with natural gas obtained directly from the wellhead at the site at which the hydration system is located. Thus, fuel from an external source is not required for the engine, and the production water is disposed of at the site without having to be transported to a disposal well.

According to another feature of the invention, the heated preprocessed production water is heated by the engine, and the heated production water is then passed through a variable size orifice to be sprayed into a duct so that the water vaporizes and hydrates the hot air passing through the duct. The air passing through the duct is heated so that it can hold more water vapor, as compared to cooler air. A maximum amount of the preprocessed production water can then be disposed of in the atmospheric air, and need not be transported to a remote site.

According to another feature of the invention, the engine can drive an AC generator to generate AC power for the electrical equipment at the well site, as well as deliver power to homes and communities that are located in the vicinity of the well site. Any excess AC power generated at the well site can be coupled back to the AC grid to reduce the cost of operation at the well site. It may be sufficiently cost effective to generate AC power at the well site using an engine fueled by the wellhead natural gas, and couple the excess AC power to the AC grid, so that no pipeline need be extended to the natural gas site. In other words, the gas well produces gas only to fuel the engine, and the excess AC power generated at the well site is sufficiently profitable that no natural gas generated at the wellhead need be sold and delivered through a pipeline.

According to an additional feature of the invention, the hydration system employs a large duct which allows the hot preprocessed production water to be vaporized therein and mixed with the hot air so that the highly hydrated air can be released to the atmosphere. The hydrating duct can be S-shaped or can be of other shapes to facilitate the hydrating of air for release into the atmosphere.

The utilization of an internal combustion engine at the well site for generating electrical and mechanical power necessarily involves the production of engine emissions. According to an advantage of the invention, the engine exhaust is released into the duct along with the production water which effectively disposes of the exhaust particulate matter and contains the same. In some embodiments, the engine exhaust can be released into the production water to effectively embed the emission gasses and solids in the production water. At the same time, the production water is heated for better forming into the vapor phase.

A further embodiment of the invention includes an internal combustion engine that is located inside the duct so that any and all of the thermal energy radiated from the engine is imparted to the incoming air, thereby efficiently heating the air.

Other features and advantages are set forth in the following description. Accordingly, the features and advantages listed above represent only some and not all of the features.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts, functions or elements throughout the views, and in which:

FIG. 3 is a diagram of the components in which the engine can drive to produce DC power to the system and for conversion to AC power to supplement the AC utility grid;

FIG. 4 is a diagram of a simplified water hydrator system according to the invention.

DETAILED DESCRIPTION OF THE INVENTION

Figure 1:
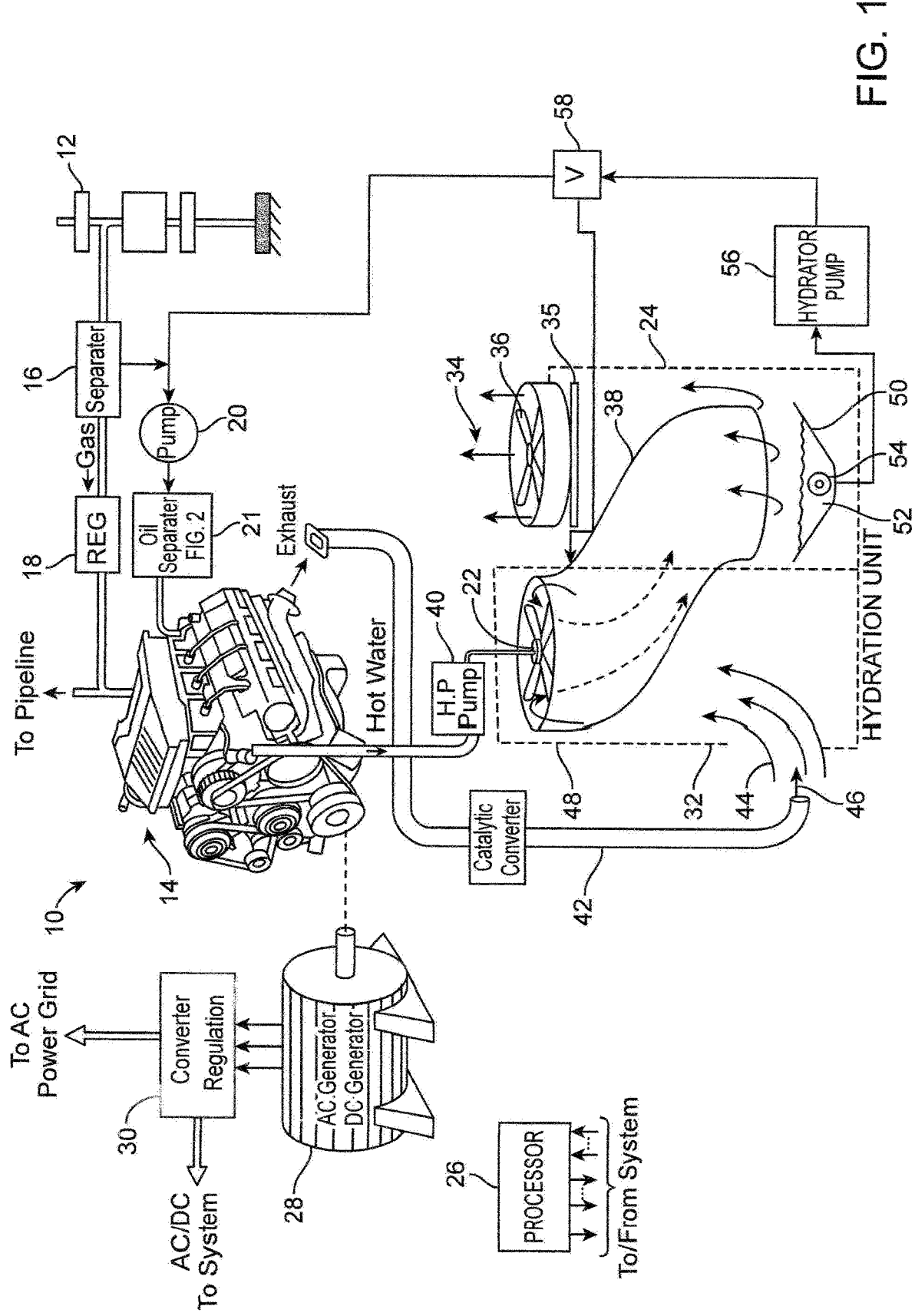
FIG. 1 is a diagram of a system for processing production water generated by a gas well.

With reference to FIG. 1 of the drawings, there is illustrated the major components of the water disposal system 10 which processes production water from a gas wellhead 12, and disposes of the water content by hydrating the atmospheric air. In this manner, a significant amount of the water is disposed of without having to haul it to a disposal well or otherwise dispose of it. Not only is the hauling cost saved, but the system uses the thermal energy generated by an internal combustion engine 14 to heat the production water. The thermal energy generated by the engine 14 would otherwise be lost to the atmosphere. With this arrangement, the engine 14 does not require a coolant radiator as do conventional internal combustion engines, and the system 10 does not require a high energy heater/burner.

In more detail, the liquid and gasses available at the wellhead 12 are under pressure and are coupled to a conventional separator 16 which separates the liquid content (oils and the water) from the natural gas. In practice, the separated production liquids would be temporarily stored in a large tank (not shown) where the oil is separated from the water by allowing the oil to rise to the top and float on the water. According to the invention, the water content is coupled to the water disposal system 10. The natural gas is coupled via a regulator 18 to the internal combustion engine 14. The portion of the natural gas not used by the engine 14 may be coupled to an available pipeline for distribution in the conventional manner.

As an alternative, the only natural gas used from the wellhead 12 can be that used by the engine 14 or other on-site components. Thus, no natural gas pipeline connected to the gas wellhead 12 is necessary in order for the water disposal system 10 to be profitable, as the system 10 is adapted for generating AC power that can be sold wholesale to the AC utility company. The engine 14 uses the natural gas from the wellhead 12, and thus the gas is not wasted by flaring the same, which is a conventional practice for disposing of the natural gas at oil wells.

The oil separated from the production water at the wellhead 12 is coupled to a separate holding tank (not shown) and when full, is hauled away by a tank truck for further processing by a refinery, or the like. The separated water is coupled via a pump 20 to the cooling system of the internal combustion engine 14. As will be described in more detail below, the separated water is heated to an elevated temperature, under pressure, and sprayed from a nozzle 22 of a water hydration system 24. Typically, the separated water is heated by the engine 14 to a temperature in the range of about 180 degrees F. to about 240 degrees F., and at a pressure in the range of about 20 to about 100 psi. The engine 14 of the type employed is generally equipped with a water pump that pumps a coolant through the cooling system of the engine 14. The engine water pump is removed and the coolant water ports are rerouted. The rate of flow of the separated water through the engine 14 determines the temperature of the water. In other words, when the separated water experiences a longer residence time within the engine 14, the hotter it is when it exits the engine 14. The engine is expected to be a natural gas fueled V8 engine with a horsepower of about 100 or more. This size of engine 14 will thus generate sufficient power to drive an AC generator 28, as well as produce sufficient thermal energy to heat the separated water to a desired temperature. It can be appreciated that for different applications, the engine and associated system components can be scaled up or down to maximize the efficiency and minimize cost.

Figure 2:
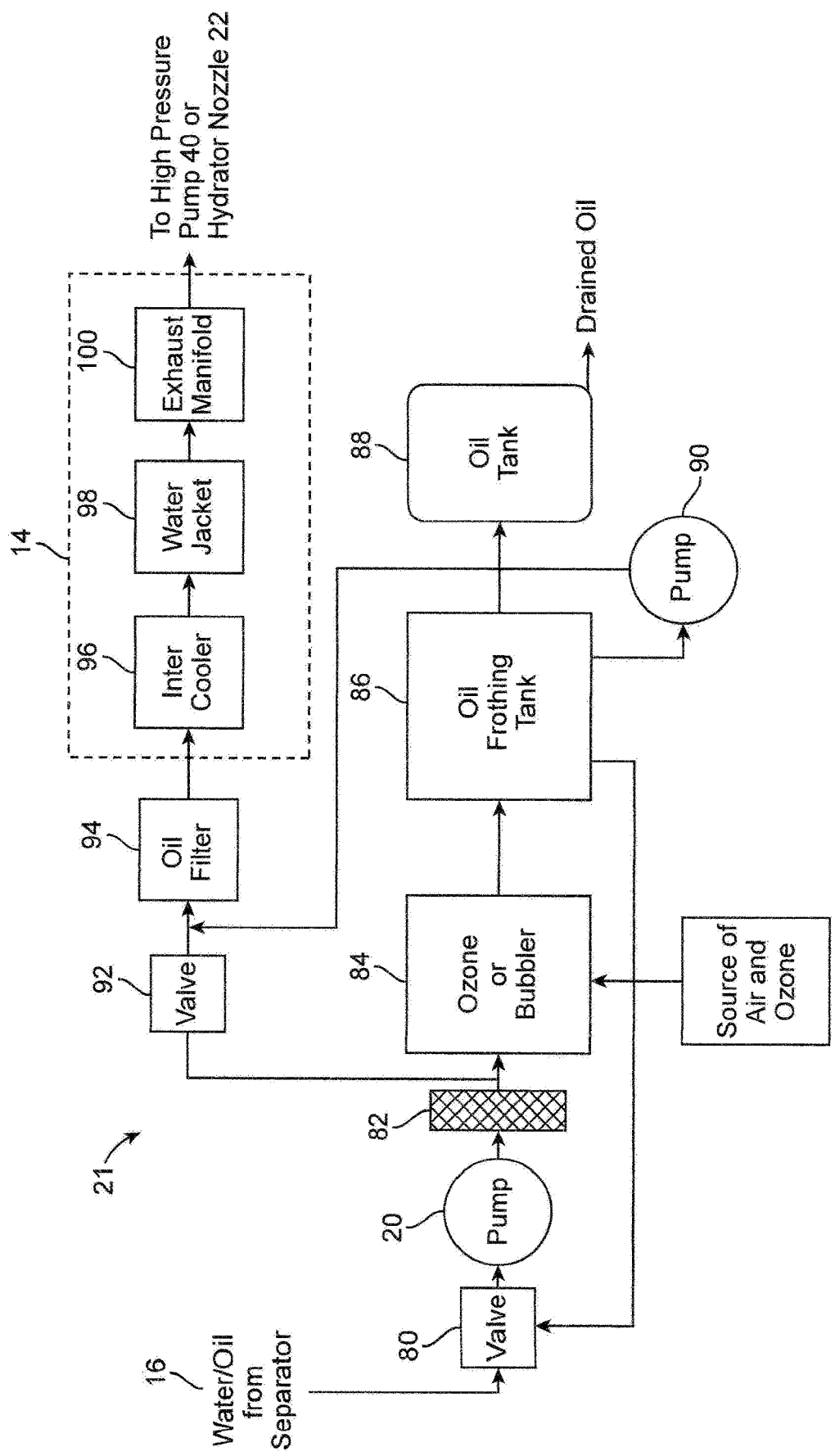
FIG. 2 is a block diagram of the organic/hydrocarbon, oil removal components of the system.

Before the separated water enters the engine 14, the organic substances are removed by an organic/hydrocarbon, oil removal system 21. This assures that the organics and the hydrocarbon components of the production water do not pass through the engine 14 and are not evaporated by the hydrator 24. The organic/hydrocarbon substance removal system 21 is illustrated in detail in FIG. 2. It is understood that the separator 16 separates the liquid from the gas components generated at the wellhead 12, and further separates the oil content from the water content of the liquid. However, the separator 16 is not effective to remove substantially all of the hydrocarbon products from the production water, and thus there remains about 1% of the oil that is carried over with the water content.

The water and hydrocarbon products mixed therein are coupled through a valve 80 from the separator 16 and pumped by pump 20 through a strainer/filter 82 to an ozone and/or micro-bubbler generator, and then to an oil frothing tank 86. The valve 80 is switchable to couple water from the pump 20 to the oil frothing tank 86, or to return water from the frothing tank 86 to be recirculated so that a given amount of water is frothed again and again without adding new water. The filter strainer 82 filters out particulate matter, and is automatically flushed so that the system does not have to be taken off line. The ozone/bubbler equipment 84 is separate apparatus that can be selected by the processor 17 to either inject ozone into the liquid stream, and/or produce fine bubbles in the liquid stream. It is known that the presence of ozone in a liquid facilitates the separation of the oil content in the water. Ozone generators are well known equipment. Standard bubble generators are also standard equipment for producing bubbles in, for example, fish tanks. The presence of fine bubbles in a liquid facilitates the separation of the oil from the water content. The oil collects on the surface of the bubbles injected into the liquid, and when the bubbles rise to the top of the liquid, the oil film on the surface of the bubbles also rises to the top, thereby producing an oily froth that floats on top of the liquid. A bubble generator can also be located in the bottom of the frothing tank 86 to generate bubbles internal to the tank 86. As noted above, the recirculation of the oily liquid to the frothing tank 86 continues to remove the oil from the water, with the oil-coated foam rising to the top.

The frothing tank 86 includes a spray nozzle (not shown) that sprays the ozone impregnated liquid and/or the bubbly liquid onto the surface of the liquid, where the liquid fills the bottom portion of the tank 86. The spray action produces a mechanical shearing action to promote separation of the oil from the water. One or more float sensors are located in the frothing tank 86 so that when the liquid level falls, the valve 80 is actuated to allow more oily liquid into the frothing tank 86. Another float detects the level of the foamy froth so that when a sufficient amount collects on top of the liquid, it is drained or skimmed off and collected in the oil tank 88. When the oily froth in the oil tank 88 reforms into liquid oil, it can be drained out of the tank 88 and pumped to the oil tank that holds the oil separated by the separator 16. Any particulate matter that also collects on the foam is carried into the oil tank 88 and is thus separated from the water.

An oil filter 94 is of the type that filters any oil from the liquid, before it enters the engine components 14. The engine components 14 are shown inside the broken line. The filter strainer 82 can be of the cartridge type that is adapted for removing the oil from the water. A valve 92 controls if the liquid from the output of the filter strainer 82 is to be coupled through the engine components 14 to the hydrator 24. Alternatively, the pump 90 can be activated to pump separated water from the bottom of the frothing tank 86 and through the engine components 14. In any event, the processor 26 is programmed to make sure that a certain volume of liquid is continuously pumped through the engine 14 at a constant flow rate to prevent it from overheating.

The filtered water is pumped through a radiator in the intercooler 96 to provide a cooling effect to the air passing through the intercooler radiator, and then to the intake of the engine 14. The engine 14 is equipped with a turbo to boost the pressure of the air used by the internal combustion engine 14. In compressing the incoming air by the turbo, energy in the form of heat is generated and heats up the incoming air. In order to improve efficiency, the air exiting the turbo and coupled to the intake of the engine 14 is cooled by the intercooler 96. The heated air passing around the intercooler radiator is thus cooled as it transfers heat to the water passing through the intercooler radiator. As a result, the air coupled to the intake of the engine 14 is cooled, and the water is heated before it is coupled to downstream equipment.

From the intercooler 96, the heated water passes through the water jacket 98 that surrounds the exhaust system of the engine 14. The water jacket equipped engine 14 is much like a typical water cooled engine that employs a water jacket to remove the heat from the engine and couple it to the water circulating through the jacket 98. When used with boats, the lake water is pumped up and through the engine, through the water jacket and back down into the lake via the exhaust system. In the present application, water may not be blended with the exhaust gasses. In any event, the water passing through the water jacket 98 absorbs thermal energy from the engine 14 and thus heats up to a higher temperature of about 220 degrees F. The water flowing through the engine 14 absorbs even more heat as it passes through the exhaust manifold 100 of the engine 14. The temperature of the water as it exits the exhaust manifold 100 is about 250 degrees F.

The heated water that exits the engine 14 is then coupled to the hydrator 24 and is flash evaporated by the variable-size orifice nozzle 22. If a high pressure positive displacement pump 40 is employed, the pressure of the heated water is pressurized to a higher pressure before being sprayed out of the nozzle 22. It is also noted in FIG. 1 that the valve 58 can be operated to recirculate any unevaporated water in the hydrator 24 back to the pump 20, and then pumped back through the engine components 14.

A programmed processor 26 is adapted for controlling the operation of water disposal system 10, which includes the hydration system 24. The programmed processor 26 is connected to multiple sensors of the systems to monitor the operation and control the same according to a programed algorithm. The processor 26 is coupled to various valves to control the flow of the liquids and fluids of the system 10 when desired. The volume of water flowing through the engine 14 can be controlled generally by the setting of the specialized flow control nozzle 22 located in the hydrator 24. A spring, or other counter force producing mechanism, can be utilized to force one member of the nozzle toward a closed direction—against the force of the pressurized liquid upstream from the nozzle 22. The processor 26 can control the spring pressure to adjust the counter force necessary to force the orifice open by the upstream liquid. If the temperature of the separated water exiting the engine 14 is too hot, for example, then the spring pressure can be reduced to reduce the counter force to open the nozzle orifice and allow more liquid to be processed through the nozzle 22. With more liquid passing through the engine 14, it will operate cooler. The engine temperature and many other parameters of the engine 14 are monitored by the processor 26. It should be noted that the size of the variable orifice size nozzle 22 also controls the volume of liquid pumped by the pump 20, which is of the centrifugal type. The larger the orifice size (as determined by the spring counterforce) of the nozzle 22, the more volume the centrifugal pump 20 will pump. The speed by which the pump 20 is driven also controls the volume of liquid pumped through the engine 14 and thus to the hydrator 24. The water passing through the engine 14 can be cooled using the incoming air from the hydrator, by spraying the water to be cooled through the incoming hydrator air, prior to entering the engine water jacket. The pump speed is controlled by the processor 26. The speed of the pump 20 generally produces the water pressure necessary for processing by the hydrator 24.

The processor 26 also senses the rotational speed (RPM) of the engine 14 to maintain it at a desired constant speed. This is because the engine 14 drives an AC generator 28 that produces AC power at 60 Hz. The AC generator 28 is typically three phase, but can be of other configurations. The AC power produced by the AC generator 28 is coupled to a converter/regulator 30 for providing the AC and DC power needs of the water processing system 10. Various pumps of the system 10 can be either AC or DC driven, depending on the requirements, such as variable speed motors, reversible motors, etc. Some of the DC requirements are for the processor control circuits, memory, drivers, relays, etc.

It is expected that the AC generator 28, or the DC alternator described below, will be of sufficient capacity so that it will deliver excess AC power to the AC power grid, and thus through appropriate conversion, provide a monetary return for the operation of the water disposal system 10. Alternatively, the excess AC power generated by the generator 28 can be used by the land owner where the wellhead 12 is situated, or to a local community.

As an alternative, or in addition thereto, the engine 14 can drive an alternator system 60, as illustrated in FIG. 3. When the water disposal system 10 utilizes a DC power producing system 60, the RPM of the engine 14 is not critical as it is when driving the AC generator 28. The DC power producing system 60 includes an alternator 62 driven by the engine 14, and DC converter/regulator circuits 64 for producing the necessary DC voltages used by the system 10. Multiple DC alternators can be driven in parallel to provide a higher current capability, or driven in series to provide a higher voltage capability, both arrangements of which provide a higher reliability. The full wave DC current produced by the alternator 62 can also be coupled to a DC to AC converter 66 for producing AC power that is coupled to the AC utility grid 70. The DC to AC converter 66 is of the conventional type typically used with systems that produce DC power from solar cell arrays. One or more DC batteries 68 can be used by the system during startup and other times. The battery 68 can be equipped with recharging apparatus for maintaining it in the charged state. With this arrangement, the speed of the engine 14 can be changed (under processor control) to produce more or less thermal energy to heat the water to the optimum temperature. The increased engine speed does not adversely affect the operation of the DC alternator 62.

The hydration system 24 is adapted for processing the high temperature, high pressure, separated water and release the same as a vapor into the atmosphere. As can be appreciated, water vapor is generally invisible, unless it condenses in the surrounding air, in which event it then becomes visible. In any event, a large volume of air is drawn through the hydration unit 24 of FIG. 1, from an input end 32 to an output end 34, by a large variable speed fan 36. The evaporated mist is drawn through a demister 35 by the fan 36. Situated within the hydration unit 24 is a large diameter S-shaped duct 38 for carrying the air drawn through it by the fan 36, as well as the high temperature, higher pressure separated water that is sprayed by a nozzle 22. The air and water are blended, thus heating the air and saturating the incoming air that was initially much drier. The nozzle 22 is preferably of the type having a variable-size orifice, and is located at the input end of the duct 38. When the nozzle 22 sprays the higher temperature, high pressure separated water into the near atmospheric pressure inlet of the duct 38, some of the water droplets immediately flash evaporate into vapor that is used to the heat incoming air which is carried through the duct 38. Increasing the air temperature allows more water to evaporate, thus achieving a higher percentage of evaporation of the produced water, as compared to just vaporizing the hot water in the cooler incoming air. An optional high pressure reciprocating positive displacement pump 40 could also pressurize the separated water and apply it to the nozzle 22. The pump 40 is preferably of the positive displacement piston type that pressurizes the separated water and highly atomizes the mist when passed through the nozzle 22. However, the positive displacement pump 40 is optional and would not be used in every application of the water disposal system 10. It is possible to drive the displacement pump 40 directly by the engine 14, as opposed to being driven by an electrical motor. Aside from generating water vapor directly, any steam resulting from the flash evaporation process becomes water vapor which is mixed with the air that is forced by the fan 36 upwardly into the atmosphere. The separated water is thus disposed of by dispersing it as water vapor that evaporates into the atmospheric air. It can be appreciated that the water vapor content of the flash evaporated liquid is not toxic and is thus safe to disperse the same into the atmospheric air. This is the case as the organics have already been removed, and thus the steam does not contain toxic substances.

The hydrator 24 can be equipped with other types of large diameter ducts, other than the S-shaped duct 38 illustrated in FIG. 1. FIG. 4 illustrates a portion of a hydration unit having a vertical large-diameter duct 71. The air 72 and the engine exhaust enter the bottom of the vertical duct 71 and are drawn upwardly through the internal space of the duct 71. The fresh air 72 mixes with the water mist generated by the nozzle 22, whereupon the water droplets evaporate and are hydrated into the air. The evaporated water in the air is drawn upwardly through a demister 35 and blown as hydrated air 34 into the atmospheric air by the fan 36, or employed elsewhere. As an example, the hydrated water vapor can be condensed to produce fresh water, or used to hydrate/heat a green house. The water droplets carried by the air inside the vertical duct 71 are collected by the demister 35 so as not to be blown into the atmosphere. The liquid water droplets fall from the demister 35, together with any moisture condensed on the inside surface of the vertical duct 71, to the bottom and are collected in a bucket or tank 74. The tank 74 functions similar to that 50 illustrated with the hydrator 24 of FIG. 1. The hydrator duct 71 can be insulated to maintain the thermal energy therein to heat the water vapor and air and facilitate the hydration process.

It is not necessary to construct a hydration unit as shown, but such a system may be structurally different from that shown, as long as it hydrates the water content of the production fluid into the atmospheric air. A hydration unit is illustrated in detail in pending U.S. patent application Ser. No. 15/041,164 filed Feb. 11, 2016, by Raymond C. Sherry, the subject matter of which is incorporated herein. It is contemplated that the engine 14 will heat the separated water to a temperature of about 250 degrees F., and if incorporated into the system 10, the pump 40 will pressurize the separated water to a pressure of about 1,500 psi. The pump 40 can be driven by the engine 14 or by a variable speed motor electrically driven by the generator 28. The drive motor for the high pressure pump 40 can be controlled as to speed by the processor 26. When the separated water is processed under these conditions, and when it exits the nozzle 22 and is sprayed into very fine droplets into the inlet end of the duct 38, it immediately evaporates into water vapor. In any event, in order for the nozzle to handle particulate matter without clogging, and to remain operational even when deposits build up on the nozzle orifice surfaces, the nozzle 22 is constructed so that a relatively constant upstream water pressure is maintained irrespective of residue buildup on the nozzle orifice surfaces, or if partially clogged by particulate matter. Such a nozzle is described in detail in U.S. Pat. Nos. 7,963,459, 8,602,320 and 8,915,453 by Sherry, as well as in pending U.S. application Ser. No. 15/041,171 filed Feb. 11, 2016, the subject matters of which are incorporated herein by reference.

It is well known that the temperature of air is a factor in determining how much vapor the air can hold before the dew point is reached. The warmer the air, the more moisture it can hold. To that end, the water disposal system 10 is constructed to couple the exhaust of the engine 14 via the exhaust pipe 42 to the air inlet of the hydration system 24. The air entering the hydration unit 24 is shown by arrow 44, and the hot exhaust fumes mixing with the incoming air are shown by arrow 46. With this arrangement, the incoming air is heated so that it can hold more hydrated moisture. This feature improves the efficiency of the system 10 without additional cost. It can be seen by the arrows that the air enters the hydration enclosure 48 near the bottom front and is pulled upwardly into the top inlet of the S-shaped duct 38, where the flashed water vapor is mixed with the hot incoming air. As noted above, the incoming air 44 is heated by the hot engine exhaust 46 so that it can hold more moisture. When the heated air and water vapor mixed therewith flows upwardly and reaches the top of the duct 38, it is pulled down into the S-shaped duct 38 and exits the bottom opening, and is then pulled upwardly outside the duct 38 by the fan 36. In order to further improve the efficiency of the system 10, the engine could be mounted within the hydration enclosure 48 so that the heat radiating from the metal block of the engine 14 is effective to heat the air passing through the hydration unit 24. The hydrated air 34 then exits the hydration unit 24 and is pushed up into the atmosphere by the high volume fan 36.

While the fan 36 is placed above the exit end of the S-shaped duct 38 in the embodiment illustrated, the fan 38 can be located elsewhere with respect to the duct 38. For example, the fan 38 can be placed relative to the engine 14 so as to blow air across the engine 14, or suck air from the engine 14 to increase the temperature of the air introduced into the S-shaped duct 38. Of course, the fan 38 and the motor that drives the fan 38 need not both be located above the S-shaped duct 38, as shown, but the motor can be located outside the duct 38 and drive the fan 38 located in or above the duct 38 with a belt or the like.

As the hydrated water passes through the duct 38 some of it may condense on the inside surfaces of the duct 38, or be trapped by the demister 35. The unevaporated liquid falls inside the duct 38 and is collected in a condensate pan 50. Any water that is not flash evaporated into water vapor by the nozzle 22 and remains in the liquid state is also collected in the condensate pan 50. In addition, any particulate matter that passes through the nozzle 22, as well as any particulate matter that forms as a result of the flash evaporation process, moves to the bottom of the duct 38 and is also collected in the pan 50. The particulate matter that forms a sludge or slurry can be removed from the hydration system 24 via an auger 54. The condensed water 52 in the pan 50 can be pumped by a hydrator pump 56 to be returned to the inlet end of the duct 38 by a processor-controlled valve 58, or returned to the holding tank (not shown) or to the inlet of the pump 20 to be reprocessed through the water disposal system 10.

The engine exhaust fumes often contain soot and other particulate matter that are coupled into the duct 38 of the hydrator 24. However, the particulate matter is effectively scrubbed by the water content not flash evaporated by the nozzle. The particulate matter from the exhaust fumes is thus not forced into the atmosphere, but rather collects at the bottom of the hydration unit 24 in the condensate pan 50. Also, the cooling/condensing of the engine exhaust reduces the environmental impact by trapping some of the volatile gasses in the liquid water that is properly disposed of.

In an effort to develop an engine with zero emissions, the engine exhaust can be blended and processed with the considerable amount of production water concentrate to cool and entrap the exhaust gasses in the concentrate for disposal or additional processing. Any engine gasses that are not entrapped can be processed in ways not normally employed for engine exhaust gasses because the gasses are much cooler at this point in the process. There may exist many methods and techniques for removing any undesirable toxins from the cooled engine exhaust gasses, depending on the contaminants being removed. Examples of the cool air processing may include chemical filters, membrane systems, etc. The cooling of the engine exhaust gasses and the corresponding cool emissions processing can be carried out prior to the production water entering the system. Stated another way, the production water can be used as a carrier to process the engine exhaust gasses in the system so that the result is a zero emission engine. Again, this is accomplished by entrapping the exhaust gasses in the production water and treating the remaining gasses by chemical or filter means. The fumes or gasses from a burner used to heat the production water can also be processed in the same manner to reduce the emissions thereof and provide a cleaner environment.

From the foregoing, the water disposal system 10 is configured to employ the internal combustion engine 14 to function as a water heater to heat the separated water to a high temperature. As such, the engine 14 does not require a radiator, thus saving cost. The exhaust gas emitted by the engine 14 is also used to preheat the air incoming to the hydration unit 24, thus improving the efficiency of the system 10. The AC generator 28, or the DC alternator 62, generates electrical energy not only for powering the water disposal system 10, but also couples the excess AC power to the utility grid to provide a monetary return, in addition to the sale or leasing of the system 10 to the owner/operator of the well 12. While the water disposal system is described above in connection with an internal combustion, reciprocating type engine 14, those skilled in the art may prefer to utilize a natural gas powered rotary turbine engine (or other means of converting chemical energy to mechanical or electrical energy).

A study has shown that the water disposal system 10 can quickly pay for itself according to the following. Currently, the cost of natural gas at the wellhead 12 is less than $2 per million BTU, and the money returned for AC energy coupled back to the grid is about $0.04 per kilowatt hour, at wholesale rates. The efficiency of the engine 14 is considered to be about 33% for different outputs, in that a third of the energy is coupled as thermal heat to the separated water circulated therethrough, a third of the engine mechanical energy is the torque to drive the generator 28, and a third of the energy is thermal in nature and in the exhaust gas coupled through the exhaust pipe 42 to heat the air 44 incoming into the hydration unit 24. It can be calculated that when using a million BTU of natural gas from the well 12 at $2.00, the generator 28 will couple 300 kilowatts/hour to the utility grid for a return of about $3.90 per kilowatt hour per 1,000,000 BTU (1 MM BTU). Thus, the profit is about twice the price of the wellhead natural gas, and infinitely more valuable than flaring the gas. It is also recognized that in many areas of the United States, the price per kilowatt hour used for electricity is directly related to the cost of natural gas. This is because natural gas is often used as the fuel to power the turbine engines that drive the AC generators for the utility companies. It can be seen from the foregoing that an operator of the water disposal system 10 can make about $1.90 per 1 MM BTU more than just selling the natural gas itself. This does not consider the saving in not having to haul the separated water away to a disposal well, and does not consider any leasing income for leasing the system 10 for field operation. The foregoing becomes even more profitable if the AC power generated by the water disposal system 10 is delivered to residential or commercial users, where the retail price to the users is typically bout $0.12 per kilowatt hour. This system can also be utilized in industrial applications that require electricity and that desire to reduce the amount of waste water.

With the self-adjusting nozzle described in U.S. Pat. No. 7,963,459 by Sherry, the upstream water pressure forces the nozzle member open, against the counter-force of a spring or other counter-force producing mechanism. The size of the orifice opening is a function of the upstream volume of liquid processed, i.e., the larger the orifice of the nozzle 22 is made, the upstream liquid that is processed will increase correspondingly. When the upstream volume of liquid tends to decrease, the spring force closes the nozzle member to make the orifice opening smaller to thereby maintain a predetermined upstream pressure. As noted above, the processor 26 controls the counter force produced by the spring of the nozzle 22, and thus the upstream pressure is controlled. As can be appreciated, the spring or other counter force acting on the nozzle member can be increased or relaxed under control of the processor 26.

If residue builds up on the orifice surfaces, this effectively makes the orifice size smaller, whereby the upstream pressure rises and the nozzle member opens against the spring force to thereby compensate for the buildup of the residue on the orifice surfaces. The system can continue operation without shutting down to remove the orifice residue. Similarly, if a particle larger than the orifice clogs a part of the orifice opening, this again effectively makes the orifice opening smaller, whereby the upstream pressure increases to thereby force the nozzle member further open against the spring pressure to overcome the clogging of the orifice opening by the particulate matter. Often, with the opening of the orifice due to clogging by the particulate matter, the orifice will open sufficiently so that the particle passes through the nozzle. It can be seen that the variable size orifice of the nozzle allows continued operation of the water processing system when processing very dirty liquids, and other liquids where solids are produced during the process of heating liquids. One example is when dissolved ionic calcium is heated, which forms calcium carbonate in a solid form. The deposits of particulate calcium carbonate carried by liquids in a system can clog and otherwise render most nozzles unusable until disassembled and cleaned.

The processing of the water that is separated from the production water of the gas well, in the environment of elevated temperatures and pressures, enables deposits and buildup of residue on the internal surfaces of the components of the water disposal system 10, including the nozzle 22. The residue and buildup can be removed without otherwise shutting down the water disposal system 10 by injecting a particulate abrasive and/or chemicals into the liquid stream at one or more different points of the system. A water processing system that employs an abrasive to clean the internal surfaces of system components, including a variable size orifice, is disclosed in U.S. Pat. No. 9,682,330 by Sherry. Any conventional type of abrasives can be employed. The abrasive passing through the system components abrades the deposits and residue and removes the same. The particulate abrasive particles as well as the removed deposits and residue are carried with the water being processed through the downstream components, including the nozzle 22. Any deposits and residue formed on the nozzle surfaces is also removed to thereby clean and rejuvenate the internal surfaces of the system components.

As noted above, the nozzle 22 employed with the water disposal system 10 is a variable-size orifice type of nozzle, described above in connection with the Sherry patents and pending application. With such type of nozzle, if the abrasive particles or the dislodged residue clog the nozzle orifice, then the upstream pressure will increase and thereby automatically (not by the processor) open the nozzle orifice to pass the particles. Accordingly, the use of a variable-size orifice nozzle allows the particulate matter to be processed with the water without interrupting the normal operation of the system 10. After the particulate matter passes through the nozzle 22, it can be collected in the container 50 located at the bottom of the hydrator duct 38 or 71.

Figure 5:
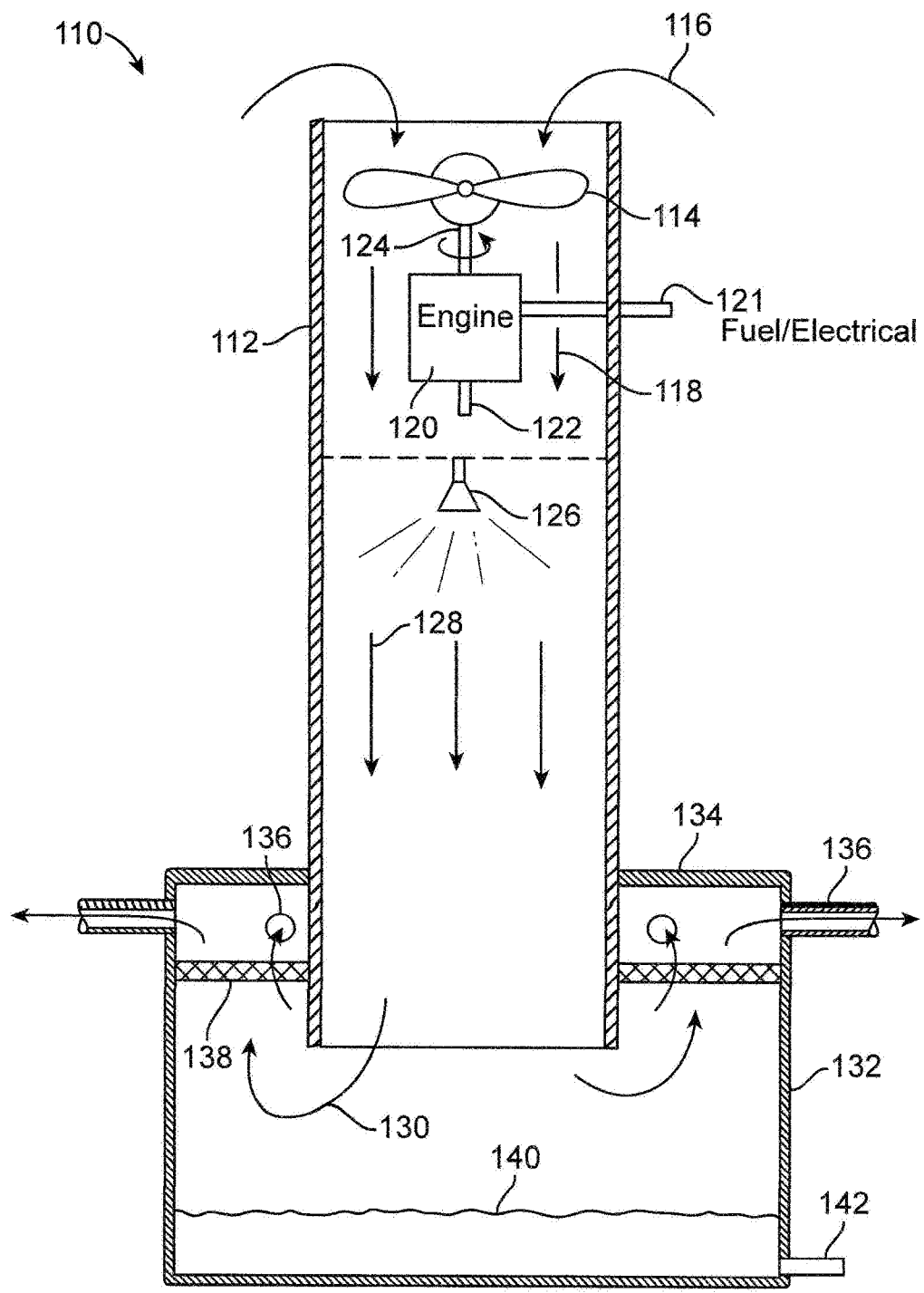
FIG. 5 is a diagram of another embodiment of a water hydrator in which the engine is located within the hydration duct.

FIG. 5 illustrates a water hydrator 110 constructed according to another embodiment of the invention. The hydrator 110 includes a duct 112 through which hot air is blown by a large fan 114. The large fan is located in the top portion of the duct 112, but can be located adjacent and above the top opening of the duct 112. The fan 114 is constructed so as to pull air (shown by arrows 116) into the top opening of the duct 112 and blow a large volume of air downwardly as shown by arrows 118. An internal combustion engine 120 is located within the duct 112 so that any thermal energy radiated by the engine 120 is used to heat the air 118 blown downwardly in the duct 112 by the fan 114. The engine 120 includes a standard exhaust pipe 122 which exhausts hot gasses downwardly with the other air 118 radiated by the engine. With this engine arrangement, the thermal energy given off by the engine 120 is all used to heat the air introduced into the duct 112 and raise the temperature so that more water vapor can be absorbed or hydrated therein and carried out of the hydration system 110.

While not shown, the torque of the engine 120 can be used outside the duct 112 and used to drive an AC generator, a DC alternator, pumps or other equipment that requires the same at the well site. The torque of the engine 120 can be made available outside the duct 112 by using a pulley and belt where the pulley is fastened to the engine shaft and the belt extends outside the duct 112 via a small opening. A gear and shaft arrangement can also be used to make the engine torque available outside the duct 112. The fuel to the engine 120 is coupled thereto by a fuel line 121 that extends through the sidewall of the duct 112. It is expected that the engine 120 can be of about 40 horsepower and constructed with a vertical crankshaft 124. The fan 114 can be of a large diameter, such as 5-10 feet. The fan 114 can be driven by an electric motor powered by a generator driven by the engine 120. Alternatively, the crankshaft 124 of the engine 120 can drive the fan 114 directly or through a gear box or clutch. A clutch can be employed to disconnect the fan 112 from the crankshaft 124 when the engine 120 is started. Then, the clutch can be engaged to allow the engine 120 to drive the fan 114 to blow air through the duct 112.

The hydrator 110 further includes a nozzle 126 of the type described above. The nozzle 126 receives the processed production water from a source (not shown) and sprays the same downwardly into the bottom half of the duct 112. In the same manner as described above, the water is sprayed into the heated air flowing downwardly, thereby hydrating the air and raising the humidity thereof. The hydrated air 128 is forced further downwardly and exits the bottom end of the duct 112. While the preprocessed production water is illustrated as being carried directly to the nozzle 126 from the preprocessing apparatus, such preprocessed production water can first flow through a jacket of the engine 120. In this event, the engine 120 would be of the type which includes a water jacket surrounding the engine for cooling the engine. The coolant that normally flows through the engine water jacket would carry the preprocessed production water, thereby heating it before being sprayed into the duct 112 by the nozzle 126. This feature further facilitates the transfer of the heat from the engine 120 to the water to be hydrated into the air. As a further modification to the hydrator apparatus, if it is desired that the preprocessed production water not flow through the engine, then a heat exchanger can be employed. The engine coolant would flow through a coiled tube in the heat exchanger, and the preprocessed production water would flow around the coiled tube so that heat is transferred from the engine coolant to the preprocessed production water. With this arrangement, the preprocessed production water is heated without having to pass through the engine cooling system.

The bottom end of the duct 112 extends into a large container or tank 132. The top of the tank 132 includes a cover 134 that is sealed against the outer surface of the duct 112. Thus, the air 130 forced from the bottom of the duct 112 into the tank 132 is forced toward the only outlets of the tank 132, which are lateral outlet tubes, one shown as numeral 136. The outlet tubes 136 can extend outwardly sufficiently so that when the humidified air is released to the atmosphere, it does not then reenter the system 110. The outer ends of the outlet tubes 136 can also extend upwardly sufficiently so that the humidified air rises into the air at a location far removed from the air inlet area of the system 110.

A demister 138 comprising a fine mesh screen, or other suitable demisting apparatus, is located around the annulus located between the inner duct 112 and the outer tank 132. The demister functions to prevent liquid droplets from being carried outside the tank 132 via the outlet tubes 136. As the humidified air 130 passes through the demister 138, the liquid content thereof is collected on the demister 138 and eventually falls as droplets down into the bottom portion of the tank 132. Any particulate matter that is introduced into the duct 112 by the engine 120, or anything that turn into particulate matter during the process, is washed down into the tank 132 with the liquid water content that is not converted into a vapor. This action tends to scrub the exhaust fumes of the engine 120. The liquid water 140 and any accompanying particulate matter collects in the bottom of the tank 132 and can be drained via a drain port 142 before the liquid rises too high in the tank 132. The water that is not converted into vapor within the duct 112 is collected in the tank 132 and can be drained and recycled through the system 110, or otherwise disposed of.

The hydrator 110 provides a very efficient water processing system that can process many gallons of production water for a very low cost. The processed water is hydrated into the atmospheric air and returned to the atmosphere as a vapor, without polluting the air. The production water from a well can be processed without trucking the same to a disposal well, and needs very little fuel and electrical power, both of which can be generated at the well site. With the engine 120 located within the duct 112, the heat generated by the engine 120 is substantially all maintained within the duct 112 to heat the incoming air. As noted above, this facilitates the amount of water vapor that can be held in the air that is processed through the system.

While the embodiments described above utilize an engine or other hydrocarbon based fuel to generate directly or indirectly thermal energy to heat or preheat the air and/or water, other techniques can be employed. For example, the thermal energy of the sun can be concentrated into a small area through which the air or water passes to thereby heat the air or water to a higher temperature to facilitate processing thereof. Solar concentration techniques are well known in the art. As noted above, the process is enhanced substantially by introducing into the hydrator the hottest air that is practical. This facilitates the hydration process by allowing more water vapor to be absorbed into the hot air. It is also appreciated that the relative humidity of the air introduced into the hydration system is lowered when the temperature of such air is heated. Thus when the relative humidity of the incoming air is reduced by heating, that means that the heated air can hold more humidity or water vapor from the processed production water.

The use of heat from the sun can be substantial and as a source of thermal energy, does not cost. The solar heat can be collected by curved collector surfaces and focused onto a smaller area. The solar heat absorbed can be facilitated by coating the receiving surfaces with a black or dark color coating. The use of finned tubes painted black can be employed for passing a fluid therethrough to increase the temperature thereof. Such finned tubes can be used so that the sun heats the tubes and then air can be passes over the finned tubes to heat the air.

The various embodiment described above include various mixtures of apparatus to carry out the intended functions. It should be realized that the apparatus disclosed herein in any of the embodiments can be utilized in any of the other embodiments, if practical. For example the hydration system of FIG. 1 discloses the use of a turbo to boost the pressure of the air used by the engine. The hydration system of FIGS. 4 and 5 do not explicitly employ a turbo for the engine, but such engines could in practice be associated with a turbo. Many other examples exist.

While the preferred and other embodiments of the invention have been disclosed with reference to specific water disposal systems, and associated methods of fabrication and operation thereof, it is to be understood that many changes in detail may be made as a matter of engineering choices without departing from the spirit and scope of the invention, as defined by the appended claims.

What is claimed is:

1. A water disposal system, comprising:
   an internal combustion engine having a coolant circulation system through which water derived from a hydrocarbon well is circulated for heating of the water;
   an AC generator driven by said internal combustion engine, said AC generator producing AC energy for the water disposal system;
   a pump for pressurizing the water derived from the hydrocarbon well;
   a hydration system having an enclosure for allowing atmospheric air to flow therethrough, said hydration system including:
   a fan for forcing air from the atmosphere through said hydration enclosure;
   a nozzle for processing therethrough the water pressurized by said pump and heated by said engine to produce water vapor in the hydration enclosure and to mix the water vapor with the air forced through the hydration enclosure by said fan to thereby hydrate the air and dispose of the water; and
   said enclosure comprising an S-shaped duct, wherein hot air enters a top end of said S-shaped duct, said S-shaped duct oriented so that the top end is located at an elevation higher than a bottom end of said S-shaped duct, said nozzle located at said top end to spray the heated water into said S-shaped duct to hydrate the hot air, where the water sprayed by said nozzle is circulated through said internal combustion engine to heat the water, and the hydrated air exits the bottom end of said S-shaped duct.

2. The water disposal system of claim 1, wherein said nozzle includes a variable-size orifice that varies as a function of the pressure of the water produced by said pump.

3. The water disposal system of claim 1, wherein said engine includes an exhaust pipe for carrying exhaust gasses produced by said engine, and wherein said exhaust pipe releases the exhaust gasses into said hydration enclosure for preheating the air passing therethrough, said exhaust gasses are scrubbed in said hydration enclosure to remove particulate matter therefrom.

4. The water disposal system of claim 1, wherein said engine is located in said hydration enclosure so that the heat radiated from the engine is effective to heat the air passing through the hydration enclosure.

5. The water disposal system of claim 1, wherein said internal combustion engine does not have a radiator.

6. The water disposal system of claim 1, wherein said engine drives an AC generator to generate electricity to drive said fan.

7. The water disposal system of claim 1, wherein said engine mechanically drives said fan.

8. The water disposal system of claim 1, wherein said hydration enclosure comprises a vertical S-shaped duct.

9. The water disposal system of claim 1, wherein said engine is located above said S-shaped duct.

10. The water disposal system of claim 1, wherein said engine is located inside said S-shaped duct.

11. The water disposal system of claim 1, wherein said hydration system is located at a wellsite producing said natural gas, and wherein said internal combustion engine combusts said natural gas as a fuel to produce heat, and said natural gas is the only fuel for generating therefrom said heat for heating the water and said AC energy.

12. The water disposal system of claim 1, wherein said generator generates AC power coupled to an AC power grid to receive a monetary profit therefrom, and said hydrocarbon well has no gas pipeline connected thereto for transporting natural gas to a distant gas processing station.

13. The water disposal system of claim 1, wherein exhaust fumes of said engine are mixed with water inside said hydration system enclosure to scrub the exhaust fumes and thus to reduce the emissions of said engine that are coupled to the atmosphere.

14. The water disposal system of claim 1, wherein said pump is controlled by a programmed processor to control a setting of said nozzle to thereby control a volume of water pumped through said engine to maintain said engine within a predefined temperature range.

15. The water disposal system of claim 1, wherein said engine is located at a top portion of said hydration enclosure, and said fan blows air down through said hydration enclosure around said engine.

16. A water disposal system, comprising:
a pump for pressurizing water derived from a hydrocarbon well;
a hydration system having an enclosure for allowing atmospheric air to flow therethrough, said hydration system including:
a fan for forcing air through said hydration enclosure;
a nozzle for processing therethrough the water to produce water vapor in said hydration enclosure for mixing with the air forced through the hydration enclosure by said fan to thereby hydrate the air; and
an internal combustion engine located within said hydration enclosure, said internal combustion engine providing power for said hydration system, and said internal combustion engine radiating heat therefrom for heating the air forced through said hydration enclosure by said fan so that said heated air holds more water vapor, said engine also exhausting hot fumes in said hydration enclosure to further heat the air flowing through said hydration enclosure to allow additional water vapor to be hydrated into the air, said fumes exhausted by said engine within said tubular hydration enclosure are scrubbed to reduce any particulate matter in the engine exhaust fumes, whereby the water is disposed of by said hydration system.

17. The water disposal system of claim 16, wherein said internal combustion engine has a crankshaft that drives said fan.

18. The water disposal system of claim 16, wherein said fan blows the air downwardly through said hydration enclosure.

19. The water disposal system of claim 18, further including a tank encircling a bottom of said hydration enclosure, said tank being closed except for communication of hydrated air from said hydration enclosure and one or more exit pipes for carrying hydrated air from said tank for release into the atmospheric air at a remote location so that the hydrated air is not processed again at an inlet of said hydration enclosure, and said tank holding any water not converted to vapor.

20. A water disposal system, comprising:
an internal combustion engine having a coolant circulation system through which water derived from a hydrocarbon well is circulated for heating of the water;
an AC generator driven by said internal combustion engine, said AC generator producing AC energy for the water disposal system;
a pump for pressurizing the water derived from the hydrocarbon well;
a hydration system having an enclosure for allowing atmospheric air to flow therethrough, said hydration system including:
a fan for forcing air from the atmosphere through said hydration enclosure;
a nozzle for processing therethrough the water pressurized by said pump and heated by said engine to produce water vapor in the hydration enclosure and to mix the water vapor with the air forced through the hydration enclosure by said fan to thereby hydrate the air and dispose of the water; and
said internal combustion engine is located at a top portion of said hydration enclosure, and said fan blows air down through said hydration enclosure around said engine.

* * * * *